3,575,758
PROCESS AND ASSEMBLY FOR THE PRODUCTION
OF CERAMIC MOLDED ARTICLES
Willy John, Postfach 105, Selb, Germany
Filed July 29, 1966, Ser. No. 568,921
Claims priority, application Germany, July 31, 1965,
N 27,115; Feb. 1, 1966, N 27,981
Int. Cl. B28b 5/02, 11/02
U.S. Cl. 156—153                              11 Claims

ABSTRACT OF THE DISCLOSURE

A process and assembly for finishing ceramic molded articles formed on assembly lines includes transferring the articles in a pre-dried state in plaster forms from a drying station to a removal station, depositing the removed articles on a pattern turnover device and then at a polishing station while simultaneously rotating the articles, polishing the rotating articles, applying adhesive thereto, and attaching handles to the articles.

---

The invention relates to a process as well as the device for the polishing of and attaching handles to ceramic molded articles, particularly cups, which are formed in a shaping station, connected in series to a drying chamber. In particular the articles are brought out in a dry state from the drying chamber in several rows parallel to each other, at right angles to the direction of movement, in plaster molds on rockers mounted on continuously moving conveyer elements.

Devices are already known wherein the molded articles are passed by the processing stations on continuous, upright-revolving chains or conveyer belts. However, with these devices the polishing and the attaching of the handles are carried out manually. In a further known device, the molded articles are passed under spongy belts consisting of suspended strips, which do the work of polishing the edge of mouth of the molded article. Contrary to the customary process, however, with this device the edge of mouth is on top causing particles polished off to fall into the interior of the molded article. These particles then must be removed separately. Additionally the strips do not completely brush the rims of small cups.

All of these devices have the disadvantage that the molded articles pass by the processing stations in a line, one after the other. Even the polishing points are disposed separate from the molding and drying equipment. The molded articles must therefore be transposed in a special work process which often causes further breakage. Furthermore, the devices cannot be utilized with respect to an assembly line consisting of several lines, where a completely new problem is posed by the lifting of the cups from the plaster molds, bringing them up to the polishing spindles, polishing them, and finally attaching the handles to the cups.

An object of this invention is to provide a process which overcomes the above indicated disadvantages.

A further object is to provide a device or assembly for carrying out the above process.

The present invention accomplishes these objects in a novel manner in that the molded articles are lifted from the plaster molds by suction cups, and while the plaster molds return to the shaping station, the cups are placed on a second conveying device in such a manner that their upper edge faces downward. The cups are then broguht to one or several polishing devices by spindles protruding through the support rockers and are automatically polished. After the polishing process the cups are brought by the rockers to receivers by which they are picked up and dabbed with dross by a special device, whereupon the handles reach the opened support and are automatically brought forward and pressed on the previously dabbed points.

In such a manner all treatment processes of the pre-dried molded articles are carried out completely automatically (up to the insertion of the handles into the mounting supports) on a plurality of tracks arranged parallel to each other in a plane, whereby the molded articles are never touched by hand.

The accomplishing of this process was not possible with known arrangements and therefore the process had to be accomplished in an entirely new manner. For example, special means had to be devised for lifting the molded article from the plaster mold. This lifting must take place with even greater care than by hand, since the molded articles are exremely breakable, particularly those articles of thin wall thicknesses. According to the invention, a solution was found in that the article lifting suction cups are not attached to the known vacuum equipment. As a result the molded articles are not crushed by too strong a suction action, but rather a simple bellows is utilized which, upon dipping the suction cups into the molded articles, are expanded to thus exert a suction action. For each tract, one bellows is provided whose suction can be separately controlled by a membrane valve, thus permitting differently formed molded articles of different sizes to be simultaneously lifted from the plaster molds by a common device. After deposit of the molded articles at the delivery point, the bellows are contracted, thereby separating the suction cups from the molded articles.

Another aspect of the invention, is the polishing station, where a plurality of molded articles of different shape are polished by a common device. The polishing, per se, takes place in a novel manner by polishing disks revolving in a water bath and preferably consisting of spongy material, each of which is driven by an electric motor. These devices can be adjusted vertically and horizontally on a common support rod and are so arranged that in the stationary position they are located between the tracks.

As soon as the molded articles are brought to the polishing station, the supporting rod with the polishing device located thereon is moved to the side until the polishing disks are situated below the molded articles. The disks together with their support spindles have previously been taken up and brought into circulation. The polishing devices are then lifted until they contact with the rim of the molded articles. In order to increase the polishing and sponging effect, the polishing devices are imparted with (at this point and until the end of the polishing process) a to and fro movement, whereupon the supporting rod is lowered beside the polishing devices and is again brought to its starting position.

Novel features and advantages of the invention will become more apparent to one skilled in the art by reference to the following description in conjunction with the accompanying drawings wherein similar reference characters refer to similar parts and in which:

Figure 1:
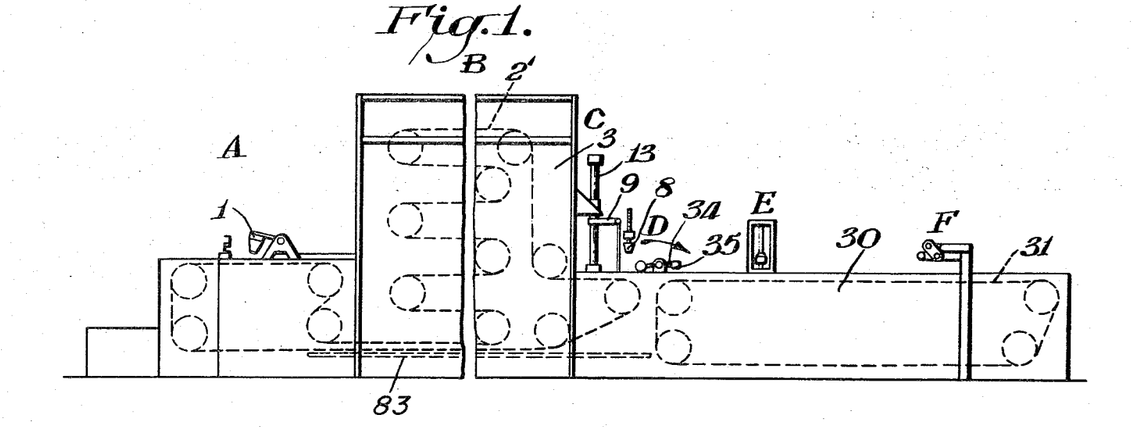
FIG. 1 is a longitudinal view of the device; an assembly for carrying out the process of this invention.
Figure 2:
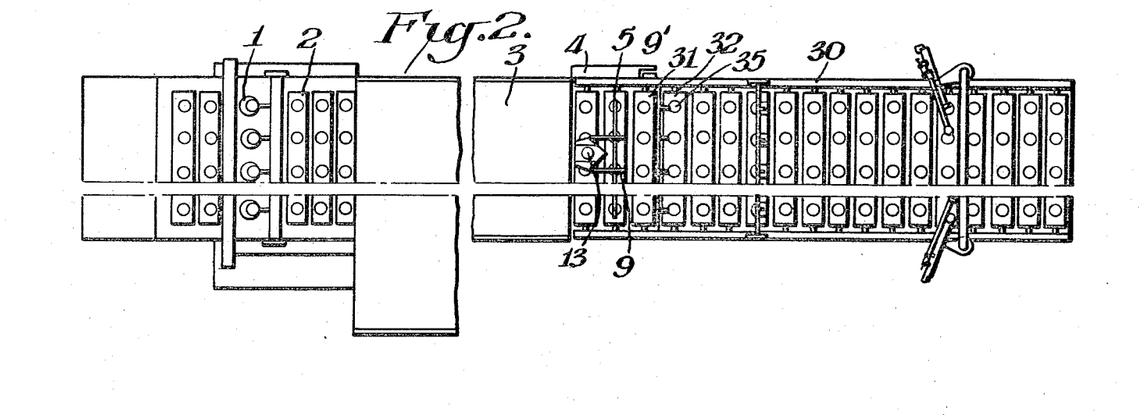
FIG. 2 is a top view of the assembly shown in FIG. 1.
Figure 14:
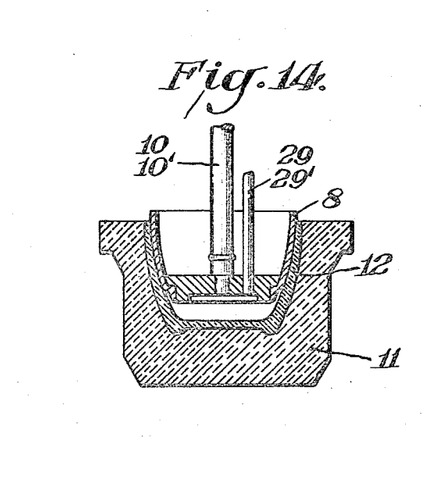
FIG. 14 is a sectional view of a suction cup with the plaster mold and molded article.

Molded articles 12 formed at station A in a conventional shaping device 1 pass a drying chamber 3 at station B by being movably mounted on rockers 2 on conveying device consisting of a continuous circulating chain 2'. As best shown in FIG. 2 rockers 2 are simply pivoted support elements having openings in their support surfaces for holding molds 11, and are suspended or pivoted on each side on chain 2' so that the rockers can rock or pivot in accordance with the tortuous path taken by conveyor 2'. By means of chain loop 4, the rockers are brought over the end of the drying chamber to such an extent that the molded articles 12 can be taken out of the plaster molds 11, as shown in FIG. 14.

Figures 3, 4, 5:
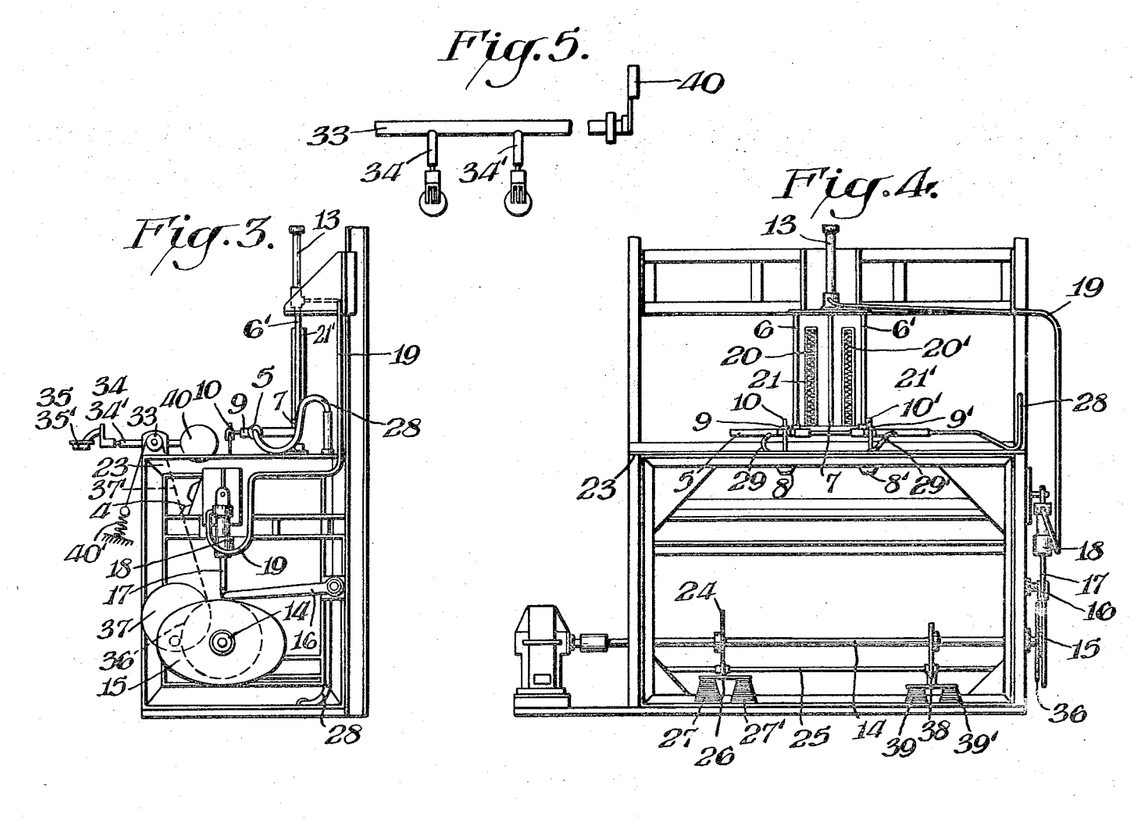
FIG. 3 is a side view of the device for the lifting the molded articles out of the plaster mold and for the transfer of same to a pattern turnover device from the assembly of FIGS. 1–2.
FIG. 4 is a front view of the device shown in FIG. 3 with the pattern turnover device omitted.
FIG. 5 is a top view of the pattern turnover device of FIG. 3.
Figure 6:
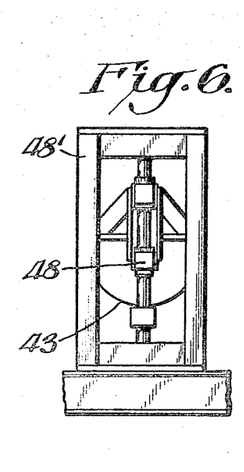
FIG. 6 is a side view of the polishing station of FIGS. 1–2.

The device necessary for this is shown at removal station C in FIGS. 3, 4, and 5. The device consists of a holding rail 5, which is situated in traverse 7, vertically movable in steering rod 6, 6'. At each holding rail 5 there are provided for each work track a suction head 8 or 8' which is arranged on lever 9 or 9' and is vertically adjustable by means of rails 10 and 10'. Levers 9, 9' furthermore can also be moved horizontally on holding rail 5, so that the suction heads 8, 8' can be adjusted precisely in the center of the molded articles 12 which are brought on the work track in plaster molds 11.

The raising of the traverse 7 is effected by cam plate 15, mounted on shaft 14. Cam 15 lifts a lever 16 together with the piston rod 17, thereby giving an upward movement to the piston in the hydraulic cylinder 18. The liquid contained in hydraulic cylinder 18 is then pressed through pipe 19 into the hydraulic cylinder 13 to also move this piston upwards. As soon as the molded articles are situated below the suction heads, the piston rod 17 is lowered by means of cam plate 15, whereby the piston in the hydraulic cylinder 18 also moves down. The liquid now returns from the hydraulic cylinder 13 to the hydraulic cylinder 18 according to the reverse movement of the piston, and the traverse 7 is lowered until the suction heads mounted on traverse 7 contact the molded articles. In order to control the speed of descent, two hold springs 20, 20' are provided. These springs are suspended on the one side on frame 23 and on the other side at the upper edge of tubes 21, 21' which are attached to traverse 7.

As soon as the suction heads 8, 8' contact or are dipped into the molded articles 12 to the required depth, cam 24 situated on shaft 14 is raised. Cam 24 had previously compressed the mutually connected bellows 27, 27' (incorporating built-in-springs) by means of lever 26, pivoting on shaft 25. Thus the raising of cam 24 creates a suction in the bellows 27, 27'. This suction by means of tube 38, hollow holding rail 5 and flexible hoses 29, 29' mounted thereon, is transmitted to the suction heads 8, 8' and effects a suction of the molded articles. By the resulting lifting of traverse 7, the molded articles are removed from the plaster molds. While the subsequent work process begins, the emptied plaster molds are returned through drier 3 to the shaping device A.

Additional equipment is provided for performing the remaining steps of the process. This equipment includes a second conveying device 30, which is also equipped with rockers or pivoted support elements 32 (similar to rockers 2), revolving on chains 31 (similar to chains 2'). It is thus unnecessary for the plaster molds 11 to be passed through by this port of the equipment and thus the shaping composition is restricted to a slight extent. In addition, in place of plaster molds, devices for the further processing can be provided which are passed through the openings made in the rockers.

As schematically shown in FIG. 1 the drive for the shaping station 1 rotates shaft 83 interconnected by suitable means to conveyors 2' and 30 for driving both conveyors at the same rate of speed.

For the transfer of the molded articles from the conveying device 2' to the conveying device 30, rocking levers 34, 34' with suction heads 35, 35' are provided on a common shaft 33 at station D. Shaft 33 also is driven by shaft 14 upon which a cam plate 36 is mounted. The drive for shaft 33 includes sprocket wheel 37 and chain 37'. As indicated in FIG. 3 rotation of shaft 14 and thus also cam plate 36 affects sprocket wheel 37 and chain 37' in such a manner with respect to an unright traverse 7, that levers 34, 34' with their suction heads 35, 35' are brought by half a turn or rotation below the molded articles 12 which are held tightly by suction heads 8, 8'. In other words rocking levers 34, 34' rotate about shaft 33 by 180°. Cam plate 15 controls the hydraulics in such a manner that the traverse 7 is lowered until the suction heads 8, 8' plunge into suction heads 35, 35'. At this moment bellows 27, 27' are compressed and the suction of suction heads 8, 8' is discontinued. Molded articles 12 are separated from suction heads 8, 8' and are transferred to suction heads 35, 35'. The traverse 7 with suction heads 8, 8' now returns to its upper starting position in which it remains until the next rocker with new molded articles is situated beneath it. Meanwhile, cam plate 38 has been raised from bellows 39, 39'. Bellows 39, 39' are thereupon expanded and produce a suction on suction heads 35, 35', causing the molded articles 12, contained therein, to be firmly held. At the same time, the effect of the cam plate 36 on chain drive 37 is released, whereupon levers 34, 34' are brought back to their starting position by a turning of shaft 33 effected by means of counterweight 40 and spring 40'. Suction heads 35, 35' are now located above rocker 32 of the conveying device 30. The molded articles contained therein now have their upper edge downwards as a result of the previously executed turning and are deposited on rocker 32 after the suction had been discontinued by compression of bellows 39, 39'.

The previously described work processes from the delivery of the molded articles 12 from the suction heads 8, 8' to the deposit of same on rocker 32, are all executed during one work process, i.e. during the forward movement of the rockers about a length of chain.

Figure 7:
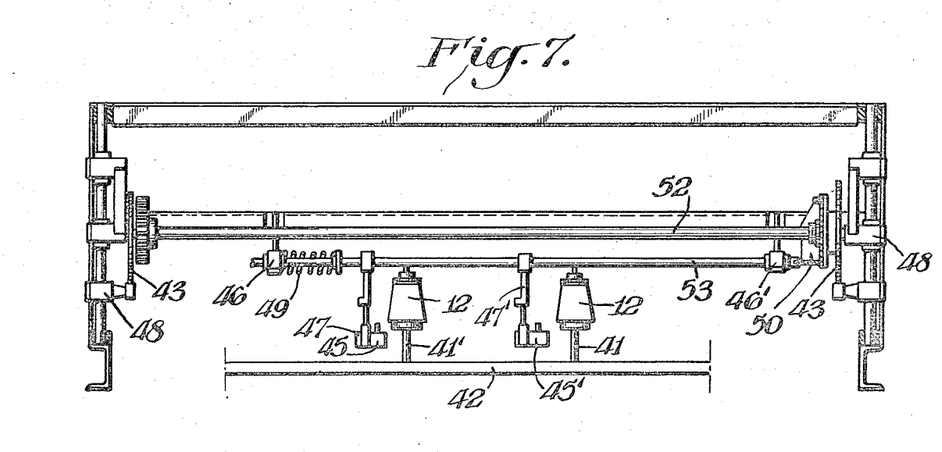
FIG. 7 is a front view of the polishing station of FIG. 6.

In the following work processes, rocker 32, with molded articles 12 situated thereon, reaches the polishing and sponging station E (FIG. 7) where spindles 41, 41' are provided. The spindles are attached to a carriage 42 which can be lifted above or lowered below the rockers by means of cam plates 43, 43'. During the raising operation, the spindle heads, which are preferably made of foam rubber, lift the molded articles 12 and bring them into the polishing position where they are set in rotation by motors (not shown). The polishing station itself consists of a supporting rod 53 for receiving the polishing tools 45, 45' which are supported in bearings 46, 46' which, in turn, are attached on a carriage 48. Carriage 48 is movable vertically in a frame 48'. For the polishing tools, holders 47, 47' are provided on a vertically adjustable support rod. The holders are furthermore movable horizontally on supporting rod 53. In order to prevent the polishing tools 45, 45' from touching the molded articles 12 during lifting, the tools are located between the work tracks in the stationary position. As soon as the molded articles are brought through the spindles to the polishing position, supporting rod 53 together with the polishing tools is moved horizontally by pressure of spring 49 against cam plate 50 located on shaft 52. Cam 50 controls the path of movement until the polishing tools 45, 45' are located under the rims of the molded articles 12. Carriage 48, supporting rod 53, and the polishing tools are then raised by the pulling of weights (not shown) against the cam plates 43, 43' (also situated on shaft 52) until the polishing tools touch the rim of the molded articles. In the following polishing process, holding rail and polishing tools are moved to and fro many times to bring about a uniform wear of the polishing tools and to increase the polishing effect. After the effected polishing, supporting rod 53 and polishing tools 45, 45' are again lowered by the cam plate 43, 43' and are then brought back to their starting position by horizontal movement by means of cam plate 50. Spindles 41, 41' are then lowered and the polished molded articles 12 are deposited on the rockers which by this time are located below the articles. The articles 12 are then conducted in a well-timed manner to the device at station F for the attaching of the handles.

During the above-described work processes, only two inner work tracks have been taken as a basis; four work tracks are taken up, however, in the subsequent dabbing of the cups with dross and the attaching of handles at station F. For the sake of clarity, in FIGS. 8–12 the right side only is the dabbing device shown, while on the left side only is the handle attaching device shown. In practice both devices are provided at each side.

Figure 12:
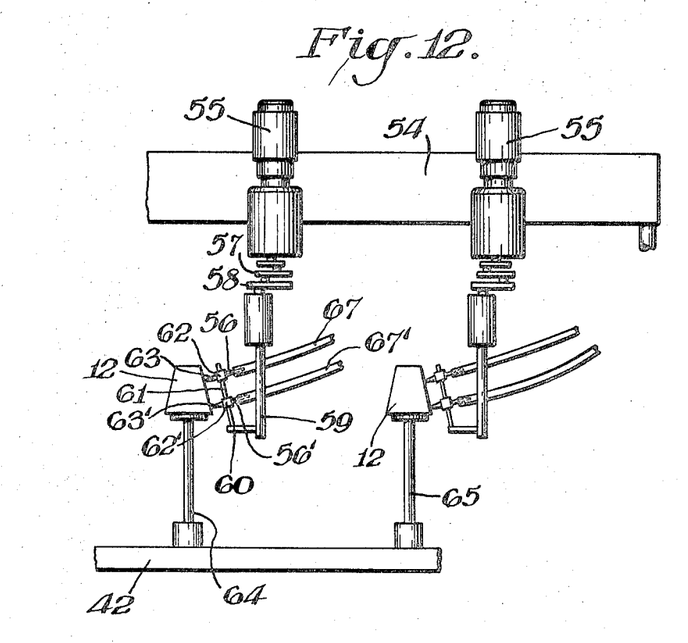
FIG. 12 is a front view of the device shown in FIG. 11.

As shown in FIG. 12 a motor 55 is mounted on support 54, provided for molded articles 12 over the conveyor tracks. Motor 55 is the drive of the dabbing device and is coupled by means of a lifting structure 57, 58 with the upper end of a shaft 59, also situated on support 54. At the lower end of shaft 59, a rod 60 is swingably clamped. Rod 60 serves for receiving the holding rail 61 upon which holders 62, 62' are mounted for dabbers 63, 63'. By turning of rod 60, by moving holders 62, 62' and by movement within the holders per se, the dabbers can be extensively displaced and thus can be fitted to any shape of cup. In the stationary position, the holding device together with the dabbers is located between two tracks. As soon as a work process of the rockers is completed and the molded articles are brought forward to the device, receivers 64, 65, which are attached to a designated carriage 42, are raised thereby lifting the molded articles 12 from the rockers by the heads provided at the upper ends of the receivers. The articles thus are brought to the height of the dabbing and handle-attaching device. By a signal, motor 55 is turned on to rotate shaft 59. During one revolution the dabbers are brought up to the molded articles with a swinging motion amounting to approximately 90°. At this moment, dabbers 63, 63' are supplied with dross by means of tubes 56, 56', on which the dabbers are extended, and by flexible hoses 67, 67' of a distribution device (not shown). The dross is then deposited on molded articles 12. Shaft 59 is next moved in the opposite direction by reversing the rotation direction of motor 55 and the dabbing device is located again at its starting position at the conclusion of rotation of motor 55.

Figures 8, 9, 10:
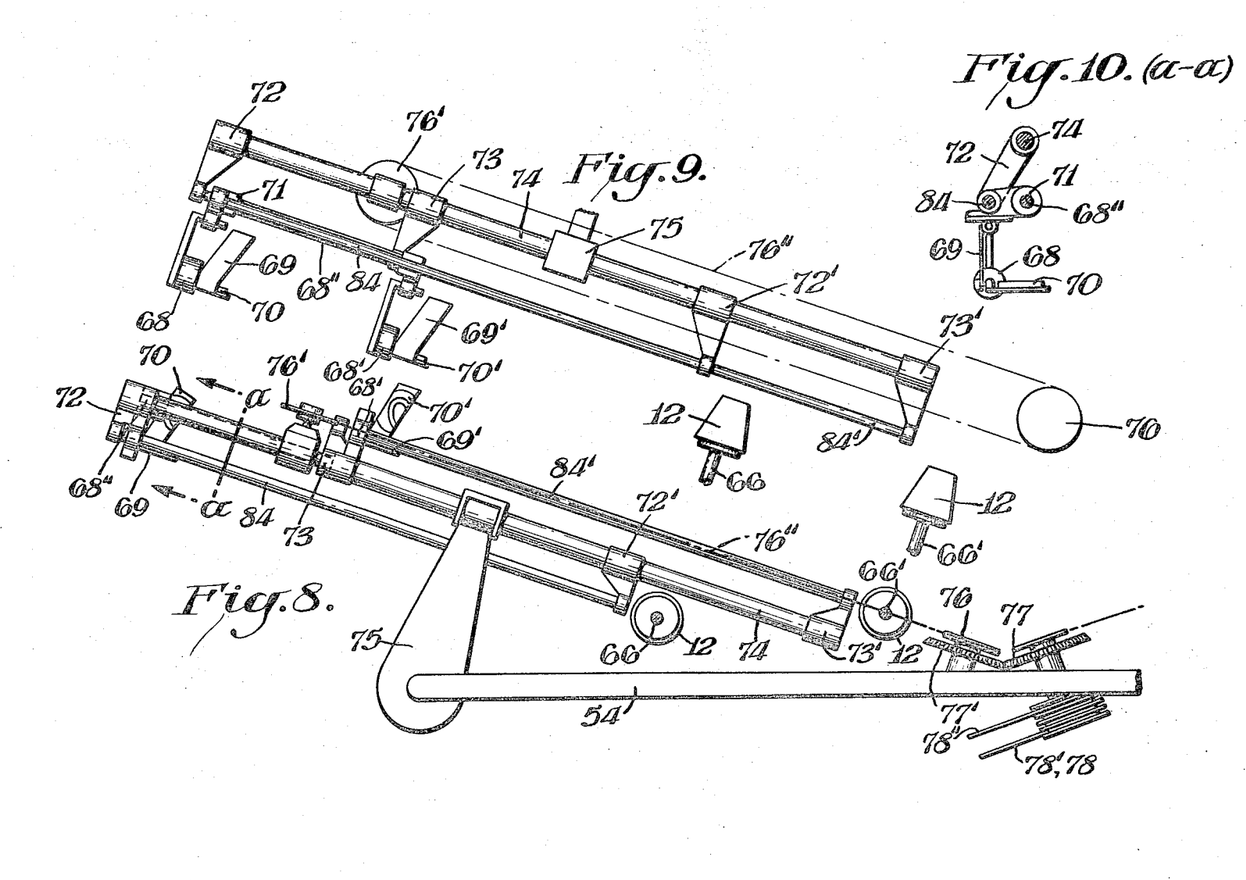
FIG. 8 is a top view of one-half of the conveying device with the device for attaching the handle of the assembly of FIGS. 1–2.
FIG. 9 is a front view of the device shown in FIG. 8.
FIG. 10 is a section through the line a—a of FIG. 8.
Figure 11:
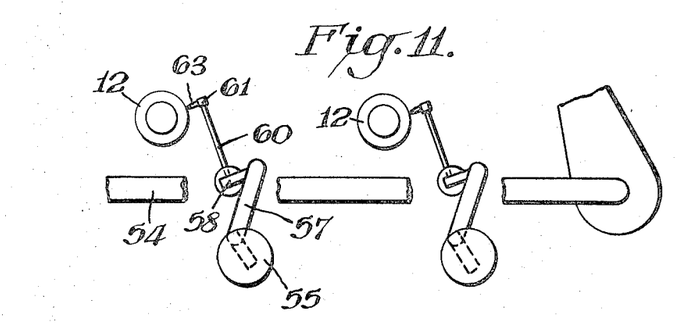
FIG. 11 is a top view of one-half of the conveying device with the dabbing device of the assembly of FIGS. 1–2.

Meanwhile, the handles to be attached to the molded articles are inserted in the receiving devices attached at holders 68, 68' (FIGS. 8, 9, 10). Each receiving device consists of stationary wedge grip 69, 69' and a hinged wedge grip 70, 70' into which the handle is inserted in the hinged-down position. Holders 68, 68' are jointly connected to a support 71, by means of rod 68", with which they are jointly displaceable on guide rods 84, 84'. The guide rods are suspended by brackets 72, 72' and 73, 73' on a supporting rod 74 situated above the brackets, the suporting rod being carried by lever 75 arranged swingably at support 54.

Figure 13:
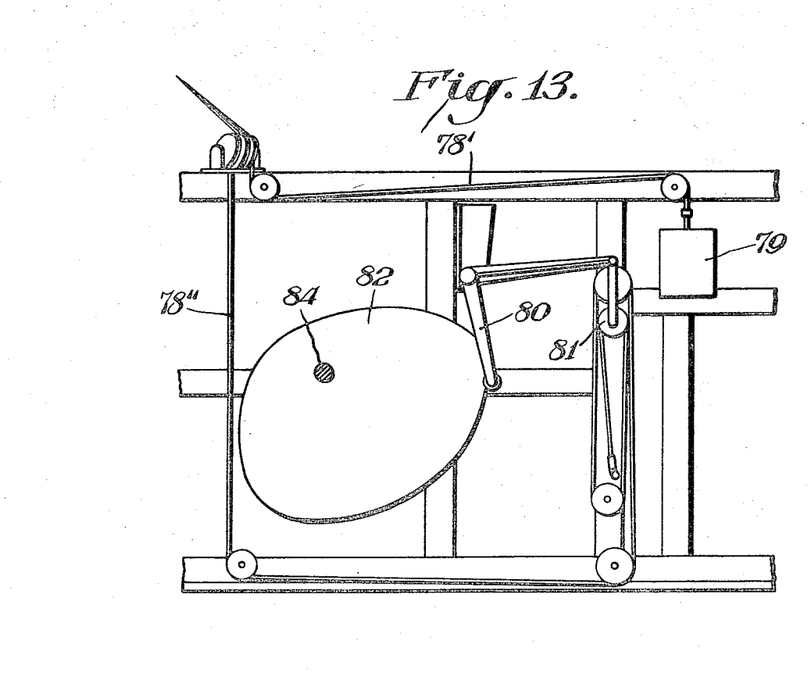
FIG. 13 is a side view of the drive for the device for attaching the handle of the assembly of FIGS. 1–2.

As soon as the handles are inserted in the receiving devices 68, 68' and the hinged wedge grips 70, 70' are again brought up against stationary wedge grips 69, 69'; support 71 carrying the receiving devices is moved toward the molded articles 12 until the handles contact the articles. Then by a signal, the rotary magnet for wedge grip 70 is switched on, flipping the wedge grip down, whereupon support 71 is again brought back to its starting position. For moving supports 71 there is provided chain 76", conducted over two sprocket wheels 76, 76', on which the support is clamped. The drive for the sprocket wheel 76 is coupled at the right side of bevel gears 77, 77'. On the shaft supporting the bevel gear 77 at the opposite end, there is mounted a cable drum 78 with cable 78' leading therefrom over guide pulleys to a counterweight 79 (FIG. 13), and a second cable 78" to a gearing device 81 which is diverted to a cam plate 82 by angle lever 80. As soon as the cam plate 82 removes angle lever 80, as seen from its axis, there occurs a gearing which is so great that it is sufficient for moving support 71 toward the molded article in the case of a relatively small cam plate 82. The reverse movement of supports 71 occurs by means of counterweight 79 mounted at the other cable. Upon attaching of the handles, the finished molded articles can be taken off either by hand or by mechanical devices and transferred to the white drier.

It is within the scope of the invention to provide if necessary still further work processes at the conveying device 30, for example for the application of engobes or for external finishing.

The holding device for the handles which are attached to ceramic molded articles, such as cups and similar objects, by means of handle-mounting machines can be constructed in such a manner that the stationary wedge grip is attached to the frontal surface of a rotary magnet and the hinged wedge grip is mounted on the stub of same in such a manner that it adheres to the stationary wedge grip during a flow of current; and with the interruption of the flow of current flips open by its own weight. By the thus achieved reduction of structural elements, and with the consumption of time connected therewith and by the elimination of the time required for the introduction and adjustment, the commercial advantages are unmistakable. Essential for this construction of the mounting machine is an arrangement wherein on a movable support a rotary magnet is attached on whose frontal surface a stationary wedge grip is situated, opposite which a wedge grip is attached on the stub of the rotary magnet to flip down, the open wedge grip adhering to the stationary wedge grip during the flow of current and falling down by its own weight during interruption of the current flow.

Obviously many modifications and variations of the invention are possible in light of the above teachings. It is therefore to be understood that within the scope of the appended claims the invention may be practiced otherwise than specifically described.

What is claimed is:

1. A process for the finishing of ceramic molded articles comprising forming sets of the articles by a set of shaping devices at a shaping station while the articles in each set are disposed side by side in plaster forms on rockers of a conveying device, simultaneously conveying the articles of each set while still on the rockers of the conveying device into a drying station where the articles are dried, simultaneously transferring the articles of each set in a pre-dried state in their plaster forms side by side while still on the conveying device from the drying station, simultaneously conducting the articles one set after another to a removal station, simultaneously removing the articles of each set from their plaster forms, simultaneously depositing the articles of each set on a pattern turnover device, simultaneously depositing the articles of each set at a polishing station while simultaneously rotating the articles of each set, simultaneously polishing the rotating articles of each set, simultaneously applying adhesive to the articles of each set, and simultaneously attaching handles to the articles of each set.

2. An assembly for finishing ceramic molded articles comprising a shaping station, a drying station, first conveying means including pivoted rockers for transporting the articles in plaster molds from said shaping station through said drying station, second conveying means including pivoted rockers disposed downstream of said drying station, lifting means including first suction heads for removing the articles from said first conveying means after the articles emerge from the drying station and for removing the articles from their plaster molds, said second conveying means including rocking levers having second suction heads, means for moving said second suction heads into engagement with the articles for depositing the articles on said pivoted rockers of the second conveying means, a polishing station with polishing means disposed adjacent said second conveying means for polishing the articles, and an attaching station with handle attaching means disposed adjacent said second conveying means downstream from said polishing station for attaching handles to the polished articles.

3. An assembly as set forth in claim 2 wherein said first suction heads are mounted on a traverse, means for engaging said first suction heads with the articles, said engaging means including piston-cylinder means for raising and lowering said traverse, cam means for actuating said piston-cylinder means, and bellows means connected to said first suction heads for controlling the amount of suction therein.

4. An assembly as set forth in claim 3 wherein second bellows means are connected to said second suction heads for controlling the amount of suction therein, and said second suction heads are arranged for depositing the articles in an inverted position.

5. An assembly as set forth in claim 2 wherein said polishing means includes spindles mounted on a carriage, cam means for raising and lowering said carriage to and from a position on the pivoted rockers on said second conveying means to and from a position above whereby the spindles remove the articles from the pivoted rockers on the upward movement and re-deposit the articles on the downward movement, support means disposed adjacent said spindles, polishing tool on said support means for polishing the elevated articles.

6. An assembly as set forth in claim 2 wherein said handle attaching means includes dabbing means for applying adhesive to the articles, said dabbing means including non-rotatable spindles for lifting the articles from said second conveying means, and swingable dabbers for applying to the elevated articles.

7. An assembly as set forth in claim 6 wherein said handle attaching means further includes a movable support, a stationary wedge grip mounted on said support, a movable wedge grip hinged to said stationary wedge grip, and rotary magnet means controlling the movement of said movable wedge grip.

8. An assembly as set forth in claim 2 wherein said handle attaching means includes a stationary wedge grip for each article, a movable wedge grip hinged to said stationary wedge grip, said wedge grips being mounted on guide means, rotary magnetic means for controlling the opening and closing of said wedge grips for grasping a handle, and means for moving said wedge grips on said guide means until the handle contacts the article.

9. An assembly as set forth in claim 2 including drive means for driving said first and said second conveying means at the same speed, and each of said first and second conveying means including a plurality of parallel tracks.

10. An assembly as set forth in claim 2 including bellows means for controlling the amount of suction of said first and said second suction heads, and said bellows means incorporating built-in spring.

11. An apparatus for simultaneously removing and vertically lifting sets of molded articles from plaster molds immediately after the articles have emerged from a drying chamber comprising first conveying means including first pivoted rockers for holding the sets of article containing molds, second conveying means including second pivoted rockers, rocking levers between said first and said second conveying means, said rocking levers being provided with article removing and depositing means, means for rotating said rocking levers 180° whereby the rocking levers simultaneously remove the articles of a set from said first conveying means and deposit the articles on the second conveying means with the articles being in an inverted position having their upper edges facing downward, a set of rotatable spindles adjacent said second conveying means downstream from said rocking levers, horizontally reciprocatable polishing means mounted on said spindles for simultaneously polishing and sponging the upper edges of the articles in each set, a set of handle mounting means adjacent said second conveying means downstream from said polishing means, said handle mounting means including sets of openable wedge means for receiving sets of handles and support means for moving said wedge means toward the articles whereby the handles contact the articles, and each support means carrying a pair of said wedge means for the simultaneous attachment of two handles by a single support means.

References Cited

UNITED STATES PATENTS

| | | | |
|---|---|---|---|
| 2,686,587 | 8/1954 | Johnson | 25—22X |
| 3,005,248 | 10/1961 | Elliott | 25—22 |
| 2,938,636 | 5/1960 | Miller | 214—1BS.4 |
| 3,222,747 | 12/1965 | Meadows | 25—22 |
| 3,367,824 | 2/1968 | Mallory et al. | 156—363 |

HAROLD ANSHER, Primary Examiner

M. E. McCAMISH, Assistant Examiner

U.S. Cl. X.R.

25—22; 156—556, 557, 558; 214—1

PO-1050
(5/69)

UNITED STATES PATENT OFFICE
CERTIFICATE OF CORRECTION

Patent No. 3,575,758            Dated April 20, 1971

Inventor(s) Willy John

It is certified that error appears in the above-identified paten and that said Letters Patent are hereby corrected as shown below:

In the title page after line [45] the following should be inserted: --- [73] assignee Gebruder Netzsch, a company organized under the laws of the Federal Republic of Germany ---

Column 1, line 67, "broguht" should be --- brought ---

Column 2, line 16, "exremely" should be --- extremely ---

Column 4, line 20, "unright" should be --- upright ---

Signed and sealed this 2nd day of November 1971.

(SEAL)
Attest:

EDWARD M. FLETCHER, JR.      ROBERT GOTTSCHALK
Attesting Officer               Acting Commissioner of Patents